Figure 1:
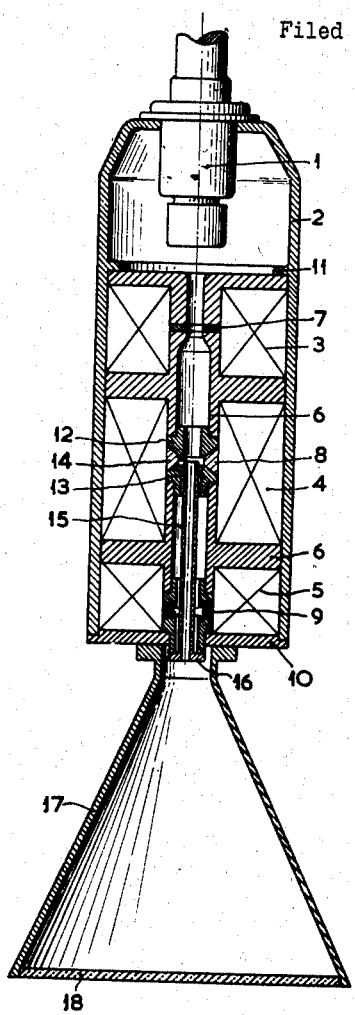

Oct. 27, 1959     A. C. VAN DORSTEN     2,910,590

ELECTRON MICROSCOPE

Filed Jan. 14, 1958

INVENTOR
ADRIANUS CORNELIS VAN DORSTEN

BY *Frank R. Trifari*

AGENT

United States Patent Office 2,910,590
Patented Oct. 27, 1959

2,910,590
ELECTRON MICROSCOPE
Adrianus Cornelis van Dorsten, Eindhoven, Netherlands, assignor to North American Philips Company, Inc., New York, N.Y., a corporation of Delaware Application January 14, 1958, Serial No. 708,925
Claims priority, application Netherlands January 15, 1957
5 Claims. (Cl. 250—49.5)

My invention relates to electron microscopes and in particular to specimen supports for such microscopes.

Since a high degree of vacuum must be maintained in an electron microscope in order to produce an image, it is customary to introduce a specimen into the microscope through an air-lock in order to prevent the admission of air. In smaller microscopes which can be evacuated fairly quickly, the microscope can be made to be disassembled and the specimen inserted in the path of the electron beam. In that case, the entire system must be exhausted of air after reassembling the microscope and before it is placed in operation.

It is an object of my invention to provide an electron microscope which is readily disassembled for insertion of the specimen and reassembled.

These and further objects of my invention will appear as the specification progresses.

In accordance with the present invention, the specimen mount is supported by a tubular carrier arranged axially in the beam channel. This carrier is, according to the invention, provided in the bore of the pole-shoe of the objective lens situated on the window side of the microscope and connected to the wall of the beam channel at its end where the rays issue.

By loosening the connection, the specimen carrier is removable from the microscope at the window end. For this purpose, the microscope portion comprising the inspection window and the impactor plate for the electron-beam are removed previously. To facilitate the replacement of the specimen its carrier may be equipped with a flaring portion which is connected to the window and comprises the impactor plate. The connection with the housing of the microscope can be made airtight by means of rubber rings. The tubular part of the carrier may also fit in an air-tight manner in the beam channel. This permits the projection lens through which the carrier passes, to be kept completely outside the vacuum.

It is necessary for the specimen and consequently for the end of the tubular carrier to be slightly movable in a lateral direction. This displacement usually amounts to a few tenths of a millimeter and should consequently be effected with great precision. For this purpose, a tightly fitting ring may be provided about the tubular carrier between the location where the carrier is connected to the stationary part of the microscope and the end facing the specimen plane of the objective lens, which ring is movable by means of adjusting screws in any direction at right angles to the axis of the beam. The desired adjustability of the specimen is also obtainable by making provision that, at a short distance from the end facing the specimen plane, the carrier is supported by a stationary tightly fitting ring, while the carrier is connected to the wall of the microscope by means of adjusting screws so as to be laterally movable.

The invention will be described in detail with reference to the accompanying drawing in which:

Fig. 1 shows the specimen carrier within the vacuum space.

Figure 2:
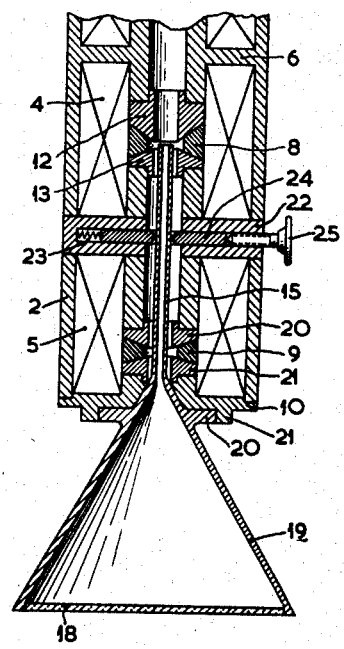

Fig. 2, which shows one mode of adjustment, the carrier forms also part of the wall.

Figure 3:
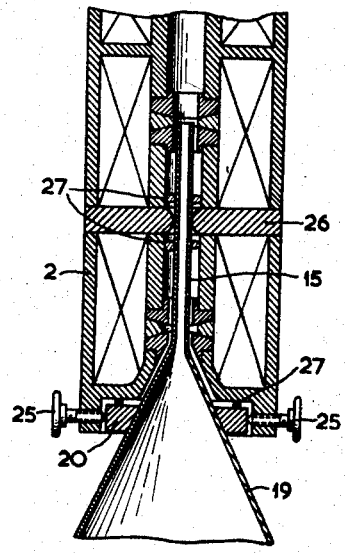

Fig. 3 shows a different mode of adjustment.

The several parts of the microscope, such as a head 1 containing the electrode system for producing the directed electron beam, and the system of electron lenses, are surrounded by a wall 2. The reference numerals 3, 4 and 5 designate the exciter coils of the condenser lens, the objective and the projective respectively. The coils are enclosed in a steel envelope 6 made up of several parts. These parts are separated from one another by means of rings of non-ferromagnetic material. A ring 7 is provided between the poles of the condenser lens, while a ring 8 separates the pole-shoes of the objective lens and the ring 9 separates the pole-shoes of the projection lens. The parts of the envelope 6 are clamped between the cover 10 and a rim 11 of the wall 2. The space within the wall 2, which contains the head 1 of the microscope and the electron-passage inside the envelope 6 are evacuated.

The specimen plane extends between pole-shoes 12 and 13 of the objective lens. The specimen rests on a bearing surface 14 at the end of a tubular carrier 15. This carrier extends from the window end of the microscope through the pole-shoe bores into the microscope. It is secured by means of a flange 16 to a fixed part of the microscope and extends completely within the vacuum space. Connected to the cover 10 is a conical part 17, the wide end of which is closed by an inspection window 18.

Fig. 2 shows the microscope portion comprising the objective lens and the projection lens. A conical wall portion 19 is integral with the tubular carrier 15 which is hermetically connected to the wall of the channel within the envelope 6. The cone 19 has a flange 20 which fits in a rim 21 of the cover 10 and is secured in it.

A partition 22 between the coils 4 and 5 of the objective and the projective is provided with an annular space 23 containing a ring 24 which surrounds the carrier tube 15. By means of, say, three adjusting screws 25, the ring is movable laterally and the end of the carrier is movable in a lateral direction. This permits several points inside the object to be projected.

In Fig. 3, the specimen is adjusted with the help of set screws 25 which are secured in the wall 2 and engage the flange 20 of the conical part 19. The carrier 15 passes through a stationary ring 26 between the projective and the objective into the microscope space. Rubber sealing rings are provided one on each side of the stationary ring 26.

In order to interchange the specimen, air is admitted into the microscope and the carrier is removed without changing the adjustment of the electron-beam. After re-inserting the specimen carrier the apparatus is evacuated and may again be made ready for use.

While I have described my invention in connection with specific embodiments, it will be apparent to those skilled in this art that other embodiments and modifications within the scope of the invention are possible without departing from the spirit and scope of the claims appended hereto.

What is claimed is:

1. An electron microscope comprising an evacuated chamber, electron beam producing means within said chamber, an electron lens system for focussing an image of a specimen disposed in the path of said beam and including an objective lens having a pair of pole members with axially aligned bores, a specimen plane between said pole members, a window for viewing the image of the specimen, and a tubular carrier supporting the specimen in said plane and extending from said specimen plane toward said window axially through one of said bores, and means to removably and hermetically secure said tubular carrier at the end thereof remote from said specimen plane to the wall of said chamber.

2. An electron microscope comprising an evacuated chamber, electron beam producing means within said chamber, an electron lens system for focussing an image of a specimen disposed in the path of said beam and including an objective lens having a pair of pole members having axially aligned bores, a specimen plane between said pole members, a window for viewing the image of the specimen, and a tubular carrier supporting the specimen in said plane and extending from said specimen plane toward said window axially through one of said bores, said tubular carrier flaring outwardly at said window end and forming with said window an evacuated space for the passage of the electron beam, and means to removably and hermetically secure said tubular carrier to the wall of said chamber at the flared end thereof.

3. An electron microscope comprising an evacuated chamber, electron beam producing means within said chamber, an electron lens system for focussing an image of a specimen disposed in the path of said beam and including an objective lens having a pair of pole members with axially aligned bores, a specimen plane between said pole members, a window for viewing the image of the specimen, and a tubular carrier coaxial with the electron beam for supporting the specimen in said plane and extending from said specimen support toward said window axially through one of said bores, means to removably and hermetically secure said tubular carrier at the end thereof remote from said specimen plane to the wall of said chamber, and means to laterally displace said tubular carrier relative to the axis of the electron beam.

4. An electron microscope comprising an evacuated chamber, electron beam producing means within said chamber, an electron lens system for focussing an image of a specimen disposed in the path of said beam and including an objective lens having a pair of pole members with axially aligned bores, a specimen plane between said pole members, a window for viewing the image of the specimen, and a tubular carrier coaxial with the electron beam for supporting the specimen in said plane and extending from said specimen plane toward said window axially through one of said bores, an annular member surrounding the tubular carrier on the side of the objective lens remote from the specimen plane, means to laterally displace the annular member relative to the axis of the electron beam, and means to removably and hermetically secure said tubular carrier at the end thereof remote from said specimen plane to the wall of said chamber.

5. An electron microscope comprising an evacuated chamber, electron beam producing means within said chamber, an electron lens system for focussing an image of a specimen disposed in the path of said beam and including an objective lens having a pair of pole members with axially aligned bores, a specimen plane between said pole members, a window for viewing the image of the specimen, and a tubular carrier coaxial with the electron beam for supporting the specimen in said plane and extending from said specimen plane toward said window axially through one of said bores, a stationary annular member surrounding said tubular carrier on the side of the objective lens remote from the specimen plane, and means to removably and hermetically secure said tubular carrier at the end thereof remote from said specimen plane to the wall of said chamber, said latter means for securing the tubular carrier to the wall of the chamber including means to laterally displace the tubular carrier relative to the axis of the beam.

References Cited in the file of this patent

UNITED STATES PATENTS 2,494,442     Le Poole _____ Jan. 10, 1950

FOREIGN PATENTS 730,203     Great Britain _____ May 18, 1955